United States Patent
Yin et al.

(10) Patent No.: US 6,632,889 B1
(45) Date of Patent: Oct. 14, 2003

(54) CONVERGENT SELF-BRANCHING POLYMERIZATION

(76) Inventors: Rui Yin, 197 Harriet Ct., Newark, DE (US) 19711; Donald A. Tomalia, 463 W. Chippewa River Rd., Midland, MI (US) 48640; Dujie Qin, 3685 Green Brier Blvd., 164A, Ann Arbor, MI (US) 48105; Jamie Dunham, 4012 Castle Dr., Midland, MI (US) 48640

( * ) Notice: Subject to any disclaimer, the term of this patent is extended or adjusted under 35 U.S.C. 154(b) by 0 days.

(21) Appl. No.: 09/365,609

(22) Filed: Aug. 2, 1999

Related U.S. Application Data

(63) Continuation of application No. PCT/US98/02838, filed on Feb. 17, 1998.
(60) Provisional application No. 60/038,727, filed on Feb. 18, 1997.
(51) Int. Cl.$^7$ .............................. C08J 271/02
(52) U.S. Cl. ................... 525/279; 525/280; 525/417
(58) Field of Search ................. 525/274, 280, 525/417

(56) References Cited

U.S. PATENT DOCUMENTS

| | | |
|---|---|---|
| 4,910,268 A | 3/1990 | Kobayashi |
| 4,946,824 A | 8/1990 | Meschke et al. |
| 5,041,516 A | 8/1991 | Fréchet et al. |
| 5,631,329 A | 5/1997 | Yin et al. |

*Primary Examiner*—Bernard Lipman
(74) *Attorney, Agent, or Firm*—McKellar Stevens; Robert L. McKellar

(57) ABSTRACT

A method of forming a branched polymer includes forming a plurality of growing linear polymer chains by polymerizing a monomer which is protected against branching and which forms a reactive end group which is in a first condition which is one of electrophilic or nucleophilic, exposing the growing linear polymer chains to a chain transfer agent to cause the reactive end group of at least a first growing linear polymer chain to reverse its electrophilic or nucleophilic character, whereby a non-reversed reactive end group on a second growing linear polymer chain reacts with the reversed reactive end group on the first growing linear polymer chain to create a branched polymer and reverses the electrophilic or nucleophilic character of the reversed reactive end group back to its first condition, whereby it may continue adding monomer in a linear fashion; and quenching the polymerization by adding a compound having multiple reactive sites capable of reacting with the reactive end groups of the polymer chains when they are in the first condition. The method allows the preparation of ultra-high molecular weight dendritic polymers in which the branching junctures are assembled in situ (i.e., are self-branching) in a convergent manner during polymerization of the monomers.

8 Claims, 3 Drawing Sheets

CONVERGENT SELF-BRANCHING POLYMERIZATION

CLAIM OF PRIORITY

This is a continuation of PCT Application No. PCT/US98/02838, filed Feb. 17, 1998, which claims priority to U.S. Provisional Application No. 60/038,727, filed Feb. 18, 1997, to each of which this application claims priority.

FIELD OF THE INVENTION

This invention relates generally to polymerization of branched polymers, and, more particularly, to a method of preparing very high molecular weight branched polymers and to the resulting high molecular weight branched polymers.

BACKGROUND OF THE INVENTION

Since the first dendrimer synthesis was reported in mid 1980's, dendritic polymers including dendrons, dendrimers, dendrigrafts, and random hyper-branched polymers have quickly been recognized as the fourth major molecular architecture, which exhibits very different properties over the traditional linear, branched, and crosslinked polymers. For example, the dendritic polymers posses smaller sizes, lower viscosities, higher number of surface functional groups, faster reaction kinetics, and controlled interior void spaces when compared with their linear counterparts. The well defined dendrons, dendrimers, and dendrigrafts are normally prepared through a stepwise synthetic process, which often makes them too expensive to be utilized in most of the industrial applications. The cheaper dendrimer analogs, random hyper-branched polymers, have mostly been prepared through polycondensation of $AB_x$ monomers (x is 2 or greater). However, due to difficulties associated with condensation reactions, the molecular weights (MWs) of these polymers were generally low, and new monomer syntheses were often required. Very recently, Frechet and his coworkers have developed a self-condensing vinyl polymerization approach, in which an AB monomer having both an initiating center and a propagating center was utilized to produce random hyper-branched polymers. Since each AB monomer has an initiating center, a large amount of initiators (equivalent to monomers) had to be utilized in this polymerization.

SUMMARY OF THE INVENTION

This invention pertains to a method of preparing ultra-high molecular weight dendritic polymers in which the branching junctures are assembled in situ (i.e., are self-branching) in a convergent manner during polymerization of the monomers. The invention also relates to dendritic polymers prepared in accordance with the method.

DESCRIPTION OF THE PREFERRED EMBODIMENTS

Figure 1:
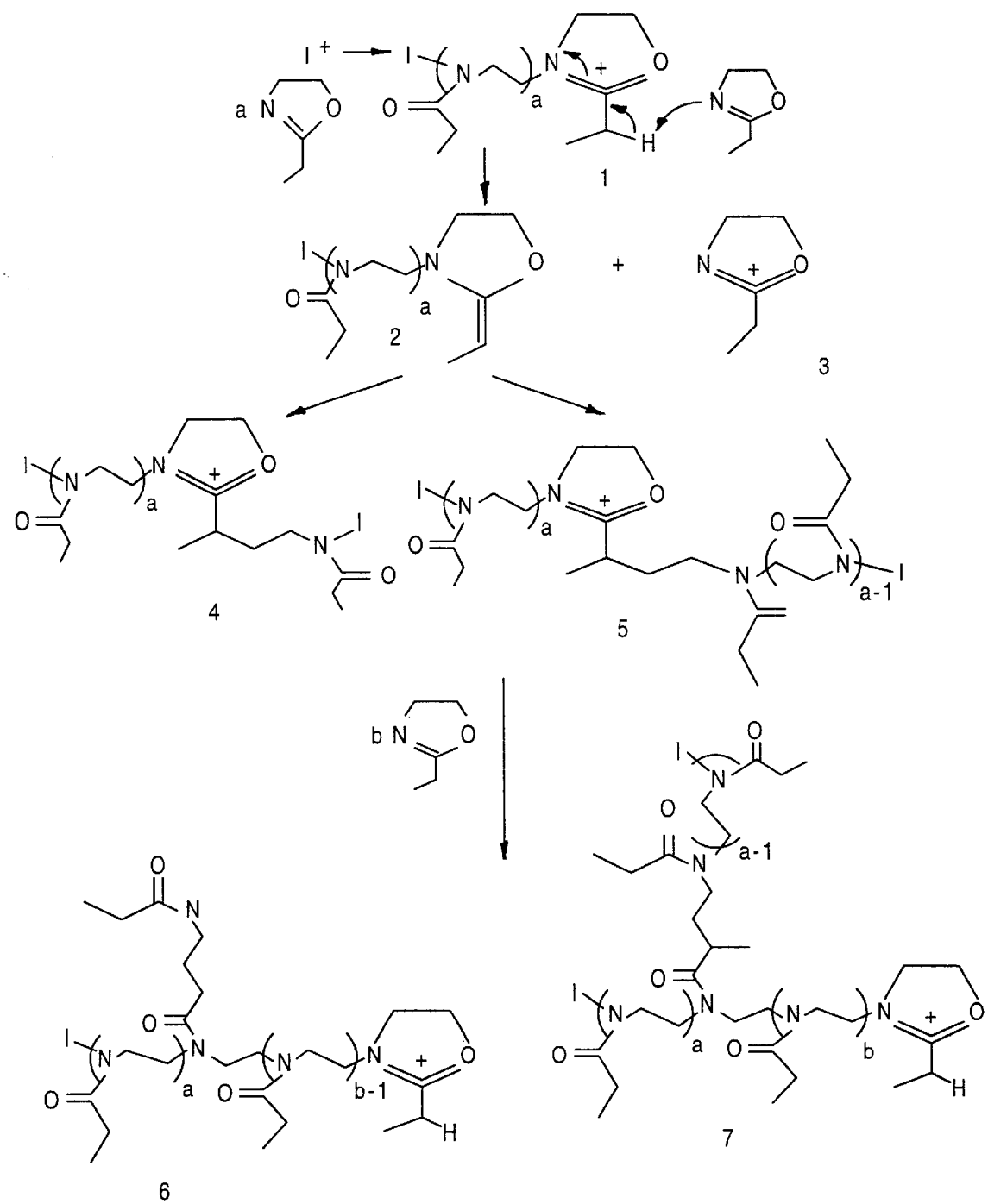
FIGS. 1–3 are reaction schemes showing the convergent self-branching polymerization of ethyloxazoline.

In accordance with one aspect of the invention, a method of forming a branched polymer capable of achieving high molecular weight comprises polymerizing a monomer which is protected against branching and which forms a reactive end group which is in a first electrophilic or nucleophilic condition. The monomer, at least during a portion of the polymerization reaction, is susceptible of reversing it electrophilic or nucleophilic character (i.e., from electrophilic to nucleophilic or from nucleophilic to electrophilic) by reaction with a chain transfer agent. The growing linear polymer chains are exposed to a chain transfer agent so that the reactive end group of a growing linear polymer chain reverses its electrophilic or nucleophilic character. Thereafter, a non-reversed reactive end group on a second growing linear polymer chain reacts with the reversed reactive end group on the first growing linear polymer chain to create a branched polymer. During this reaction wherein the non-reversed reactive end group of a second growing linear polymer reacts with the reversed reactive end group of a first growing linear polymer, the electrophilic or nucleophilic character of the reversed reactive end group is again reversed back to its first condition. Upon being reversed to its original condition, the end group which was originally part of the first growing polymer chain reacts with a monomer from which linear polymerization proceeds. Thereafter, the resulting branched polymers having an electrophilic or nucleophilic end group are reacted with a compound having multiple reactive sites capable of reacting with the reactive end groups of the polymer chains when they are in the first condition, whereby a branched polymer is formed from a monomer which is protected against branching.

In accordance with another aspect of the invention, a composition of matter comprising a branched polymer prepared by the method of this invention is provided.

This invention provides a new approach to the production of ultra-high MW dendritic polymers in which the branching junctures are assembled in situ (self-branching) through a convergent manner during the polymerization of commercially available monomers. We term this polymerization as convergent self-branching polymerization (CSBP). In contrast to the polycondensation of $AB_x$ monomers, in which interior branching junctures have been previously built in the monomers, the self-branching polymerization generates branching junctures during the propagation of monomers. Similar to the synthesis of Starburst® dendrimers, these branching junctures can be constructed through both divergent and convergent approaches. The divergent self-branching polymerization (DSBP) amplifies its reactive chain ends and allows them to branch from an inside core to outside terminal groups, while the convergent self-branching polymerization combines the reactive chain ends and allows them to branch from the outside terminal groups to the inside core. The best example for DSBP is Frechet's self-condensing vinyl polymerization, in which both an initiating center and a propagating center were present in each AB monomer, and the branching junctures were generated through simultaneous and continuous initiating and propagating processes during the polymerization. In the case of CSBP, in addition to chain propagation, a chain branching reaction also occurs during the polymerization. For example, a chain transfer reaction (from an active chain end to a monomer) may generate a macromonomer, as well as another new active chain end. This macromonomer can then be combined with this new or another active chain end to generate a dimer-like molecule with a new active chain end in the middle of the polymer chain. The resulting chain ends can further propagate with more monomers and then combine with another macromonomer to form a Y-shape branched molecule with a newly generated reactive chain end at the focal point. This newly generated reactive chain end can again propagate with more monomers and then combine with another macromonomer to form a hyperbranched polymer with its reactive chain end at the focal point. This process will repeat again and again during the polymerization until the chain end is terminated. If the terminating moiety is a monofunctional core molecule, a dendron-like hyper-branched polymer will be formed. If a multifunctional or dendrimer core is utilized, a dendrimer-like, spherical hyper-branched polymer will be generated. Similarly, if a multifunctional linear polymeric core is used, a dendrigraft-like hyper-branched polymer will also be obtained.

A fundamental difference between traditional linear polymerization and a self-branching polymerization is that the former prefers one reaction pathway (i.e., propagation), while the latter undergoes two or more reaction pathways (i.e., propagation and branching). For example, in a traditional vinyl or ring-opening polymerization process, one reaction pathway (i.e., initiation and propagation) is often preferred in order to produce pure linear polymers. However, in reality, it is very difficult to control the polymerization condition, which only allows the desired reaction pathway to occur. In most cases, there are always some side reactions occurred during the polymerization processes, which generate undesired side products such as pre-terminated low molecular weight linear polymers, cyclic polymers, chain transfer polymers, and branched polymers. If the undesired "side reaction" (i.e., premature termination and cyclization) can be suppressed and the desired "side reactions" (i.e., chain transfer and branching) can be promoted in addition to polymer chain propagation, the conventional polymerization processes which were widely used to produce one dimensional linear polymer could also be utilized to prepare three dimentional tree-like polymers.

As a particular example, the invention will be illustrated with reference to the convergent self-branching polymerization of ethyloxazoline.

With reference to FIG. 1, a cationic initiator, such as a carbonium ion is contacted with ethyloxazoline to form a growing linear chain having an end group which is electrophilic. This growing linear chain having an electrophilic end group is designated by the number 1 in the reaction scheme. At some point during the polymerization process, a chain transfer agent (in this case the monomer itself) reacts with the growing chain to form a linear polyethyloxazoline chain having a nucleophilic end group (represented by the compound designated by the number 2 in the reaction scheme). The nucleophilic linear polymeric chain (compound 2 in the reaction scheme) can react with the electrophilic linear polymer chain (compound 1 in the reaction scheme) to form a compound (compound 5 in the reaction scheme) having an electrophilic reactive moiety bounded to two linear polymeric chains, and with the electrophilic moiety serving as a site for additional polymerization of a polymeric branch. In particular, compound 5 in the reaction scheme can be reacted with additional monomer to form a branched polymer (the compound designed number 7 in the reaction scheme) having one branch with a reactive, electrophilic terminal. In accordance with an alternative pathway, compound 2 can be reacted with the protenated monomer (compound 3) to form compound 4 in the reaction scheme. Compound 4 in the reaction scheme can be reacted with additional monomer to form a polymer (compound 6) having a reactive, electrophilic end group.

Figure 2:
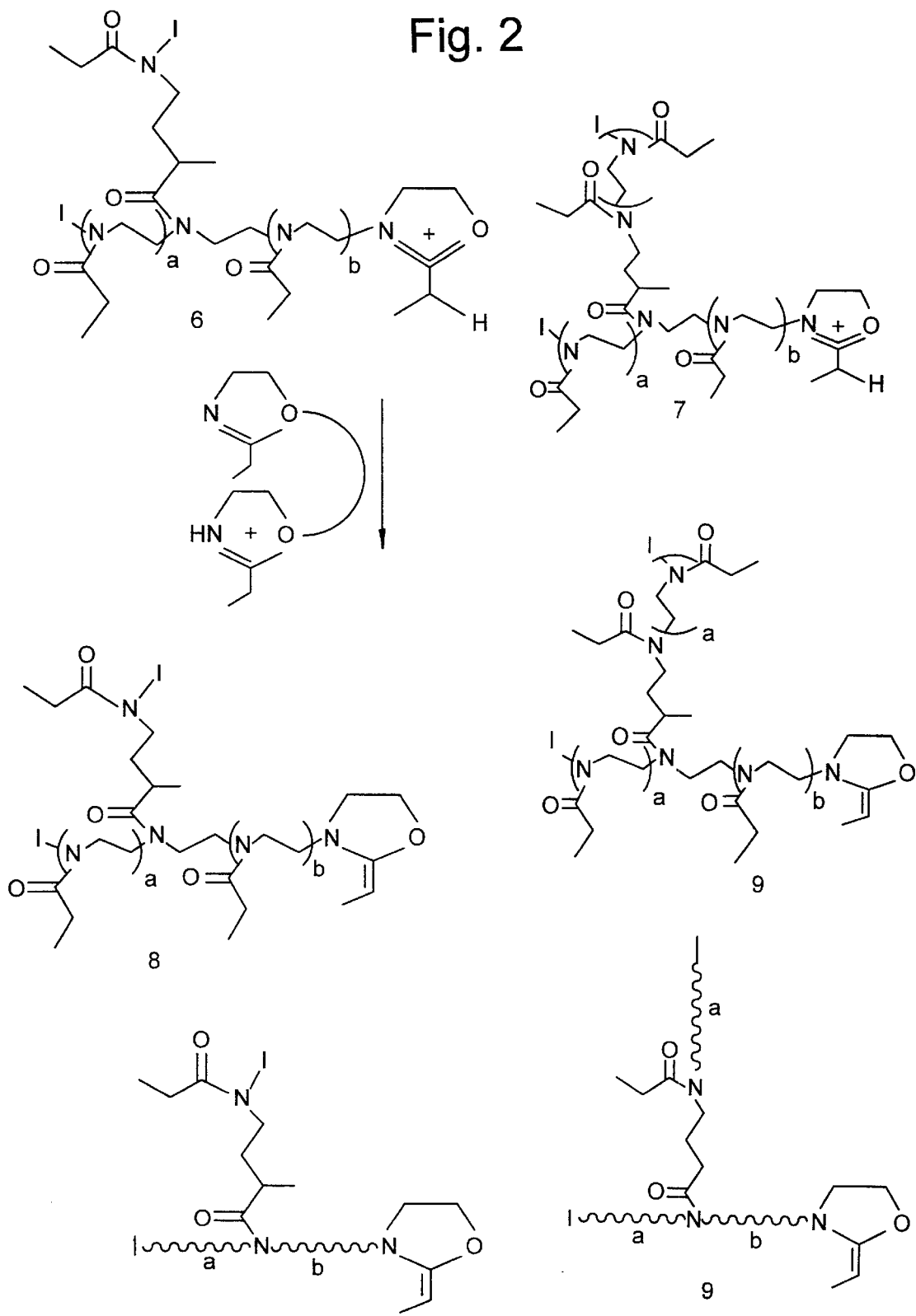
Figure 3:
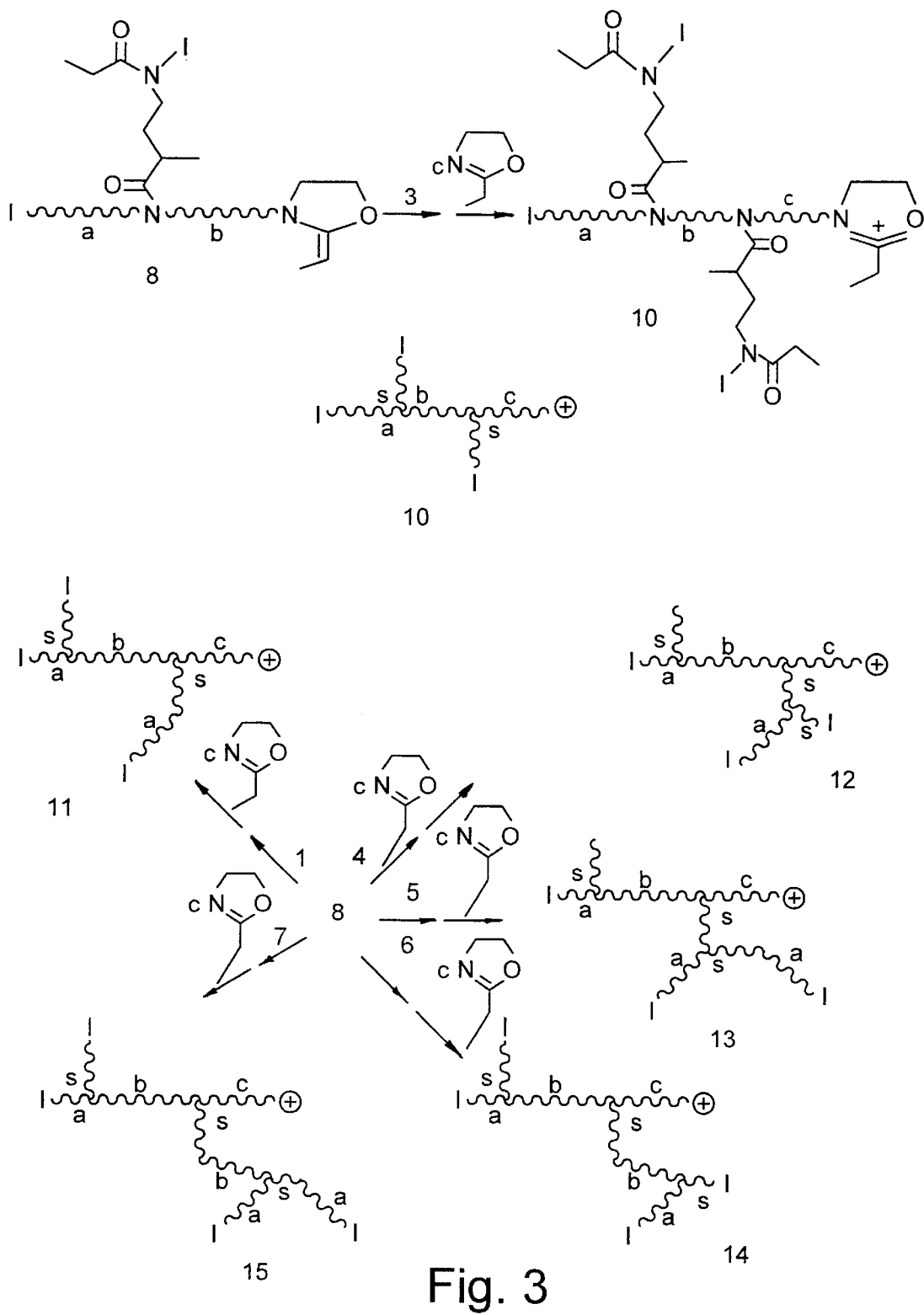

With reference to FIG. 2, polymers 6 and 7 can be reacted with additional monomer to form polymers 8 and 9 which can be represented in either of two alternative schematic formulas illustrated in the reaction scheme. As shown in FIG. 3, polymer 8 can be reacted with additional monomer or additional monomer and one of compounds 4, 5, 6 or 7 to form polymers 11, 12, 13, 14 and 15 respectively.

The various polymeric compounds formed in the above reaction scheme can be reacted with (i.e., quenched with) any of various compounds having multiple reactive sites capable of reacting with the reactive end groups of the various polymer chains. For example, in the case of the polyethyloxazoline compounds (e.g., compounds 7–14) can be contacted with a linear polyethyleneimine having a plurality of nucleophilic reactive sites which can combine with the polyethyoxazoline compounds having electrophilic sites. The compound having multiple reactive sites capable of reacting with the reactive end groups on the polymer chains can be of generally any molecular architecture. For example, in the case of the polyethyleneimide compounds the polyethyleneimide can be linear, including rigid rods, and cyclic or closed linear polymers; cross-linked polymers, including lightly cross-linked polymers, densley cross-linked polymers, and interpenetrating networks; branched polymers, including random short branched polymers, random long branched polymers, regular comb-branched polymers and regular star-branched polymers; or dendritic polymers, including random hyper-branched dendritic polymers, dendrigrafts, dendrons, and dendrimers.

Synthesis of New Dendritic Polymers

Using the method of this invention, polymers having a molecular weight of 1,000,000 or above can be prepared. For example, a hyper-branched polymer having a linear polyethyleneimine core with a plurality of branched polyethyloxazoline moieties grafted thereto can be prepared in accordance with this invention having a molecular weight of at least 1,000,000.

The convergent self-branching polymers of this invention can be advantageously employed in various applications including: Ag/Pharma Delivery, Lubrication, Adhesives, Rapid Cure Coatings, Composites, Crosslinking Agents, Metal Chelation, Gene Transfection, Diagnostic Assays, MRI Agents, Water Treatment, Environmental Remediation (Clean-up), Paper Finishing Chemicals, Viscosity Modifiers, Antistatic Agents, Ceramic Fabrication, Polymer Additives, Ink-jet Pringting, Photographic Reagents, Reprography reagents, Chromatography Supports/Ion Exchange Resins and Electrophoretic Gels.

EXAMPLES

Methyl p-toluenesulfonate, p-toluenesulfonic acid, morpholine, and diisopropylethylamine were purchased from Aldrich. 2-Ethyloxazoline was obtained form Monsanto. Toluene, methylene chloride, diethyl ether, and methanol were purchased for Fisher. Methyl p-toluenesulfonate was purified by vacuum distillation, while 2-exthyloxazoline, morpholine, diisopropylenthylamine toluene, and methylene chloride were stirred over $CaH_2$ and distilled prior to use.

Synthesis of Hyper-Branched Polyethyloxazoline Polymers [HBP(500-20)]

The synthesis of hyper-branched polyetheneoxazoline [HBP(500-20)] is provided as a general procedure for the preparation of hyper-branched polymers. A mixture of p-toluene sulfonic acid (1.92 g, 0.01009 mol) in 500 ml of toluene was azeotroped to remove water with a distillation head under $N_2$ for about 15 min. After cooling to about 60° C., 2-ethyloxazoline (500 g, 5.045 mol) was added dropwise through an addition funnel, and the mixture was allowed to reflux between 6 and 24 hours. To this mixture was added a linear polyethylenemine core (0.015 mol of NH, 1.5 eq), which was dried by azeotropic distillation from toluene, followed by immediate addition of diisopropylethylamine (2 eq). The mixture was refluxed for 2 hours, cooled, and the top toluene layer was decanted off. The crude product was redissolved in methanol and then precipitated out from a large excess of diethyl ether. The bottom layer was redissolved in methanol and dried by rotary evaporation and vacuum to give a PEOX hyper-branched polymer as a white solid (~500 g, MW>1,000,000, Tg~40° C.). Other hyper-branched polymers such as HBP (250-20), HBP (250-50), HBP (250-100, HBP (250-500), HBP (500-20), HBP (500-50), HBP (500-500), HBP 750-20), HBP (750-50), HBP (750-100), HBP (1000-100), HBP (2000-100), and HBP (5000-100) etc. could be prepared in a similar manner. All the products were analyzed by SEC, NMR, DSC, and TGA.

Synthesis of Hyper-Branched PEI Polymers, PEI (500-20)

To a round bottom flask was added 40 g of HBP (500-20), 20 g of concentrated $H_2SO_4$ (98 wt %), and 200 ml of deionized water. The mixture was refluxed for 6 hours, and then neutralized by NaOH until pH is around 10–11. After rotary evaporation of water, the crude product was redissolved in methanol, and then filtered through a Buchner funnel. The filtrate was rotary evaporated to remove methanol, and the residue was redissolved in methylene chloride and then filtered through a Buchner funnel. The filtrate was rotary evaporated and then dried by vacuum to give a hyper-branched PEI polymer, PEI(500-20)-$NH_2$ as white gum (MW>500,000 Tg—-2° C.).

What is claimed is:

1. A method for forming a branched polyethyloxazoline or polyethyleneimide polymer capable of achieving high molecular weights comprising:

forming a plurality of growing linear polymer chains by polymerizing, as a monomer, 2-ethyloxazoline which is protected against branching and which forms a reactive end group, upon contact with a carbonium ion, which is in a first condition which is electrophilic, and which at least during a portion of the polymerization reaction is susceptible of reversing its electrophilic character to nucleophilic by reaction with more of said monomer functioning as a chain transfer agent;

exposing the growing linear polymer chains to the chain transfer agent to cause the reactive end group of at least a first growing linear polymer chain to reverse its electrophilic character, whereby a non-reversed reactive end group on a second growing linear polymer chain reacts with said reversed reactive end group on said first growing linear polymer chain to create a branched polymer, and reverses said nucleophilic character of said revised reactive end group back to its first condition of electrophilic character, whereby it may continue adding monomer in a linear fashion; and quenching the polymerization by adding polyethyleneimine capable of reacting with said reactive end groups of said polymer chains when they are in said first condition of electrophilic character, whereby a branched polymer is formed from said monomer which is protected against branching.

2. The method of claim 1 in which said monomer is selected such that the linear polymer chains which it forms grow to degrees of polymerization in excess of about 100 before the electrophilic character of said reactive end groups is capable of being reversed by exposure to remaining monomer units acting as chain transfer agents.

3. The method of claim 1 in which said chain transfer agents are not introduced into said reaction vessel until after the polymerization has been allowed to proceed for a time sufficient to yield linear polymer chains of a desired degree of polymerization.

4. The method of claim 1 in which said compound having multiple reactive sites comprises one or more of the group consisting of linear polymers, branched polymers, cross-linked polymers, and dendritic polymers.

5. A composition of matter comprising a polymer prepared by the method of claim 1.

6. The composition of claim 5 having a molecular weight of about 1,000,000 or above.

7. The composition of claim 5 wherein the polymer is polyethyloxazoline.

8. The composition of claim 5 wherein the polymer is polyethyleneimide.

* * * * *